May 29, 1951 R. F. COLEMAN ET AL 2,555,222
GOLF TEE
Filed July 30, 1949 2 Sheets-Sheet 1

INVENTORS.
ROY F. COLEMAN and
WILLIAM A. HANGER
BY Pennie, Edmonds, Morton and Barrows
THEIR ATTORNEYS.

May 29, 1951 — R. F. COLEMAN ET AL — 2,555,222
GOLF TEE
Filed July 30, 1949 — 2 Sheets-Sheet 2

INVENTORS
Roy F. Coleman and
William A. Hanger
BY
Pennie, Edmonds, Morton and Barrows
THEIR ATTORNEYS Patented May 29, 1951

2,555,222

UNITED STATES PATENT OFFICE 2,555,222

GOLF TEE

Roy F. Coleman and William A. Hanger, Rye, N. Y., assignors to themselves, as copartners Application July 30, 1949, Serial No. 107,696

19 Claims. (Cl. 273—33)

This invention relates to golf tees and the general purpose of the invention is to provide an improved golf tee construction, the tee structures heretofore proposed being objectionable for one reason or another.

One of the best known golf tees consists of a head having a cup or socket to support the golf ball and below which there projects a slender cylindrical shank or stem with a pointed end. The shank is inserted in the ground in order to make the tee stand upright to support the ball, and it is pushed into the ground to a greater or less extent depending upon the height above the ground, or ball position, desired. It is necessary for the player to bend or stoop down and then push the tee into the ground, which has been found objectionable by many players, besides often requiring some little time and effort to adjust the tee to obtain the correct ball position.

Another disadvantage of the push-in-the-ground type of tee is that in many places, such as the West, South, and Southwest, of the United States, the ground is normally so hard that it is difficult, if not impossible, to make the tee penetrate it. Furthermore, a player usually wishes to tee his ball uniformly to the same height every time he drives off from a golf course tee. This can be accomplished only to an approximate extent by the use of the push-in type of tee, since the ball position depends on the distance to which the tee is inserted in the ground. On the other hand, different players tee their balls to different ball positions, and some find it necessary to provide themselves with tees having extra long shanks in order to get the ball high enough.

The object of the present invention is to overcome the objectionable features of the push-in type of golf tee and provide a tee structure which does not have to be inserted in the ground in order to make it stand upright, and by means of which the ball can be supported selectively in different ball positions as suited to the individual player without having to push the tee into the ground to different extents.

Another object of the invention is to provide a golf tee structure which, with or without the selective ball position feature, will support the ball uniformly at the same height above the ground each time it is used and will necessarily maintain the ball supporting cup in horizontal position if the ground on which the tee rests is horizontal, and which is maneuverable by the head of the golf club to support the ball as desired. Other objects and advantages of the invention will be apparent as it is better understood by reference to the following specification and the accompanying drawing illustrating, by way of example, several embodiments of the invention, and in which:

Figure 1:
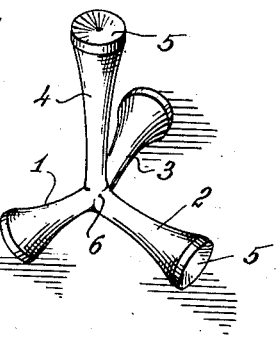
Fig. 1 is a perspective view of the preferred form of the improved golf tee structure.

Referring now to the accompanying drawings, the golf tee structure of the invention comprises four legs, as indicated respectively by the reference numerals 1, 2, 3 and 4, and preferably of unequal length, the shortest leg being indicated by numeral 1 and the longest by numeral 4. At the outer end of each of these four legs there is a concave surface forming a cup or socket of appropriate size and shape to support a golf ball. The inner ends of each of the four legs are permanently joined together at a juncture 6. These inner ends may be joined in any suitable way although preferably the four legs are made integral with one another, the golf tee being preferably molded out of a soft rubber or plastic. Any other suitable material, however, may be employed.

The cups or sockets 5 are uniform in diameter and the angularity of the legs 1, 2, 3 and 4, that is, the angularity of their axes with respect to one another is such that when any three of the legs rest on a substantially horizontal surface, the fourth leg is supported in substantially vertical position. This may be seen from an examination of Figs. 2-5, and 2a-5a, inclusive.

Figure 6:
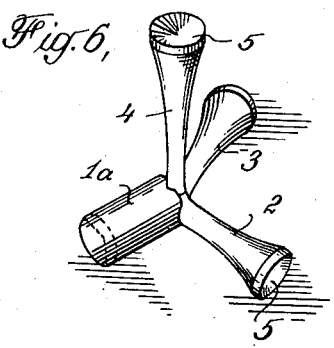
Fig. 6 is a view similar to Fig. 1 of a modified construction.
Figure 2:
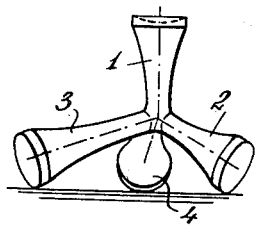
Figs. 2, 3, 4 and 5 are views in side elevation of the tee shown in Fig. 1 in four different positions and providing four different ball positions or heights of support above the ground.
Figure 3:
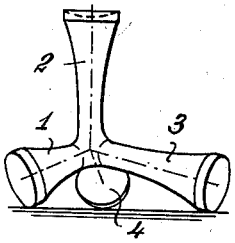
Figure 4:
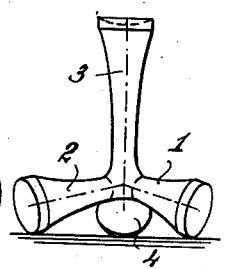
Figure 5:
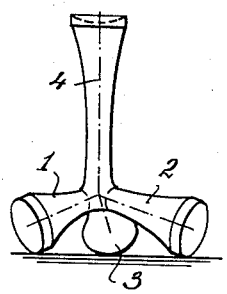
Figure 2A:
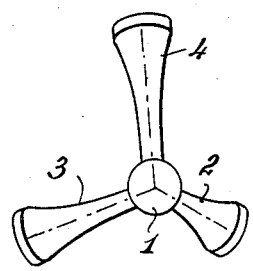
Figs. 2a, 3a, 4a and 5a are plan views corresponding, respectively, to Figs. 2, 3, 4 and 5.
Figure 3A:
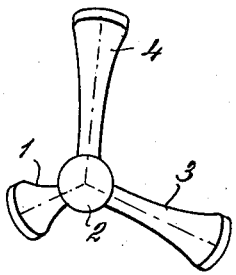
Figure 4A:
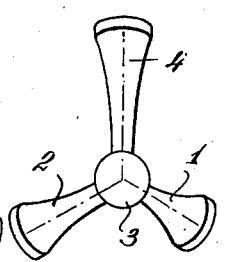
Figure 5A:
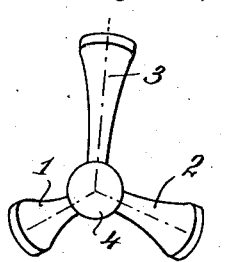

The legs 1-4, inclusive, may have any desirable shape or configuration although they are preferably tapered from their outer or cup ends toward their inner ends at the juncture 6 as shown, for example, in Fig. 1. In order to facilitate the molding operation one of the legs, for example, the short leg 1a may be made cylindrical in form as shown in Fig. 6.

Figure 7:
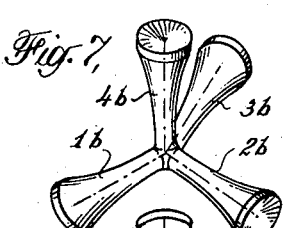
Fig. 7 is a view, also similar to Fig. 1, of another modification.
Figure 8:
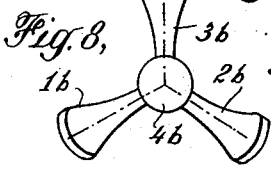
Fig. 8 is a plan view of the tee shown in Fig. 7.

Referring now to the modification shown in Figs. 7 and 8, the legs 1, 2, 3 and 4 are all of equal, instead of unequal length. This form of the invention has all of the advantages of the forms shown in the other figures except that the golf ball is supported at the same height above the ground regardless of which of the four legs is upright. Thus, it does not have to be pushed into the ground, but may merely be dropped on the ground and then moved into the desired position by the head of the golf club. In order to provide for supporting the ball at different heights, this form of tee can be made in a number of sizes.

A comparison of Figs. 7 and 8 with the remaining figures is helpful in understanding the ability of the preferred form of tee to support any one of its legs in upright position regardless of which three of the unequal length legs rest on the ground. In the tee of Figs. 7 and 8, the axes of the four legs (which are indicated by the dot and dash lines) are disposed at precise 120° angles to one another. That is to say, considering a plane through any two of the leg axes, for example, legs 1b and 4b of Fig. 8, the axes of each of the other legs are located at an angle of 120° to this plane. The same thing is true concerning the angles between the axes of any three legs projected in a plane at right angles to the axis of the fourth leg (see Fig. 8). The diameters of the cups 5, that is, of the heads of the legs all being equal, it follows that regardless of which three legs rest upon the ground, the fourth leg will be supported in vertical position.

Referring now to the form of the invention shown in Fig. 1, Figs. 2–5, and Figs. 2a–5a, inclusive, the axes of the legs of this tee structure are also indicated by dot and dash lines. However, in no case is the angle between any of these axes precisely 120°, but, inasmuch as no two of the legs are the same length, the angles between them vary from 120° so as to compensate for the differences in the leg lengths.

The four axes of the four legs of the tee structure may be considered as passing through the apexes of a tetrahedron. Each axis is perpendicular to the face of the tetrahedron opposite the apex through which is passes, and all four of the axes pass through a common point within the tetrahedron, this point being the center of juncture 6 in the golf tee structure.

Figure 9:
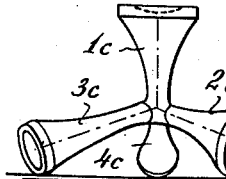
Figs. 9, 10 and 11 show still another modification, Fig. 9 being a side elevation similar to Fig. 2, Fig. 10 being similar to Fig. 5 and Fig. 11 being a plan view of the tee shown in Fig. 9.
Figure 11:
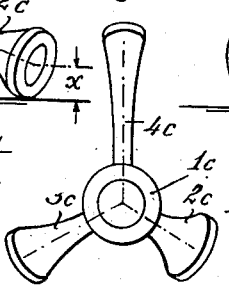
Figure 10:
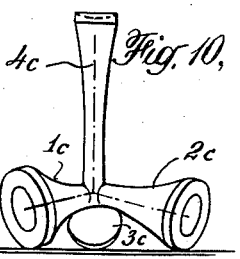

In the modified form of tee shown in Figs. 9, 10 and 11, the legs 1c, 2c, 3c and 4c are of unequal length as in the preferred form shown in Fig. 1. Also, the angularity of the axes of the four legs is similar to that of the form of tee shown in Figs. 7 and 8, that is, the angles between axes are equal. This tee, however, has all of the advantages of the preferred form of tee, including the support of the ball at different positions or elevations depending upon which leg is turned uppermost. Regardless of which three of the legs rest upon the ground, the fourth leg is supported in substantially vertical position, this being accomplished by making the distance $x$ from the center of the cup to the bottom of the head portion when the leg rests on a supporting surface different for each of the four legs.

This may be accomplished by varying the configuration of the heads of the four legs in a variety of ways. In the modification shown in Figs. 9, 10 and 11, it is accomplished by making the head portions of the legs of different diameters so that for the smallest head, which also is on the longest leg 4, the diameter of the ball cup is substantially the same as the diameter of the head, as is the case in the forms of invention shown in Figs. 1–8, inclusive. The head portions of the other three legs, 3c, 2c and 1c, are progressively larger, that is, their size varies inversely with the leg length.

Figure 12:
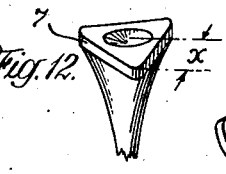
Fig. 12 is a fragmentary view of a leg to illustrate a still further modified form of tee.
Figure 13:
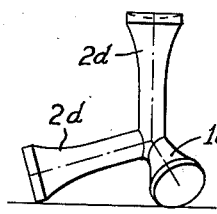
Figs. 13 to 26 illustrate additional modifications.
Figure 14:
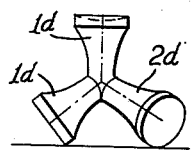
Figure 17:
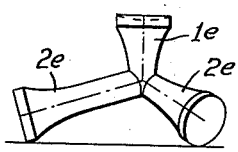
Figure 18:
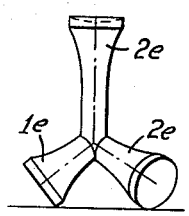
Figure 15:
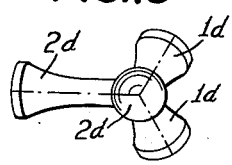
Figure 16:
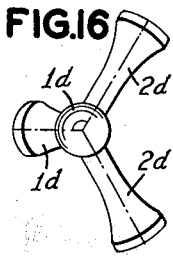
Figure 19:
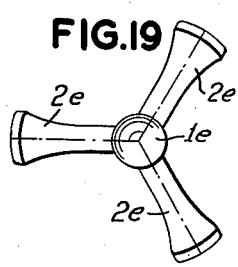
Figure 20:
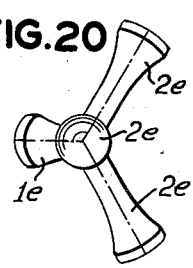
Figure 21:
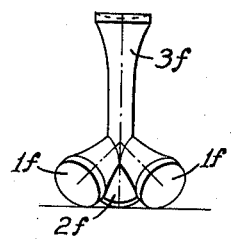
Figure 22:
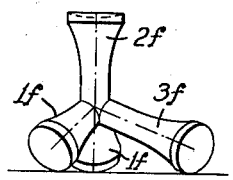
Figure 23:
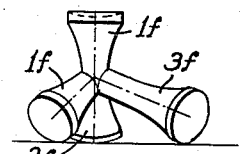
Figure 24:
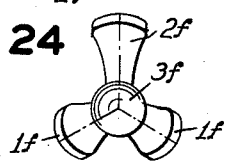
Figure 25:
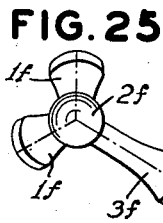
Figure 26:
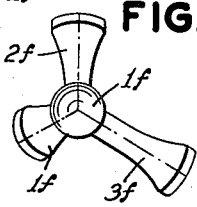

In the modification shown in Fig. 12, the above result is accomplished by making the head portion 7 of the tee leg of triangular shape, the distance $x$ depending upon the size of the head, or its angular position with respect to the axis of the leg, or by making the heads of some of the legs in the shape of equilateral triangles while the heads of the other legs are non-equilateral. It will be understood that other head configurations, such for example as oval, rectangular, hexagonal, etc. may be used for the purpose of varying the distance $x$ for the four legs so as to cause one of the legs always to be supported in vertical position when any three legs are allowed to rest upon a horizontal surface.

In connection with either of the modifications shown in Figs. 9–12, it will be understood that vertical support of one of the legs regardless of which three legs rest on the horizontal surface can be obtained by a combination of varying the angularity of the axes of the respective legs and variation of the distance $x$, whereas in the form shown in Figs. 9–11 the angularity of the legs is equal, that is, the angles between the leg axes are all the same, and the maintenance of one leg always in the vertical position is produced entirely by varying the distance $x$.

Referring now to the several modifications shown in Figs. 13–26, in each of the three modified forms of tee here illustrated the four legs are arranged in two groups as to length, the leg length being different for different groups but the same for legs in the same group. This provides a tee having less than four different ball elevations or positions.

In the form shown in Figs. 13–16, the groups each consist of two legs, that is to say, there are two short legs 1d and two long legs 2d, each, of course, having a ball cup at its outer end. Thus, the two legs 1d are of equal length, and the other two legs 2d are also of equal length but different from the first pair.

In the form shown in Figs. 17–20, one group consists of a single short leg 1e and the other group consists of three long legs 2e, all of the same length. In the form shown in Figs. 21–26, two of the four legs are of the same length and the other two legs differ in length not only from the first two but from each other. There are two short legs of the same length, whereas leg 2f is longer, and leg 3f is still longer.

It will be understood that regardless of this variation in the length of the legs of the different groups, the vertical position of the upright leg is maintained regardless of which leg is placed uppermost, and this condition can be obtained in any of the ways described hereinabove, that is, entirely by angularity of the leg axes, keeping the diameters of the head or cup portions of the legs equal, or it can be maintained by placing the axes of the legs at the same angular distance from each other and varying the distance $x$ (Figs. 9 and 12), that is, by utilizing circular heads of different diameters, or by utilizing non-circular heads, of oval, triangular, or other desired shape and turning the head of each leg on its axis so as to produce the necessary length of the distance $x$. Further, the upright position may be obtained by a combination of these two constructions.

Figure 28:
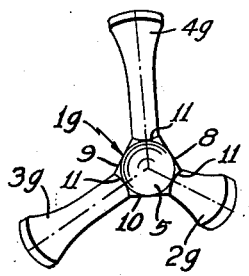
Figs. 27 and 28 show a further modification, Fig. 27 being a fragmentary perspective view and Fig. 28 a plan view of the complete tee.
Figure 27:
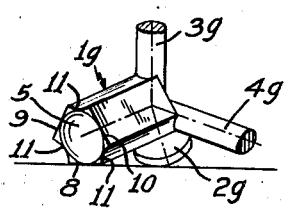

The modification shown in Figs. 27 and 28 has been devised for the purpose of improving the stability of the tee when a short leg is included among the three upon which the tee rests. When a short leg is one of those which supports the tee, as is the case in either Fig. 1 or Fig. 6, the leg 4, for example, has ample stability in the direction of legs 2 and 3, but is not as stable in the direction midway between legs 1 and 2 or 1 and 3. If too much lateral force is applied to the upright leg 4 in either of these latter two directions, the point of support of leg 1 or of leg 1a tends to move around the rim of such leg in one direction or the other.

In order to overcome this tendency, a short leg, for example, leg 1g of Figs. 27 and 28, instead of being provided with a circular head surrounding ball cup 5, is provided with a head having a flattened base formation 8 on the side where it rests on the ground or other supporting surface. The width of this base can be varied to suit conditions and the degree of stability desired, but it is preferably made to approximately correspond with the diameter of the ball cup 5. Also, two other base formations 9 and 10 are preferably included, arranged in approximately, but not exactly, symmetrical position with respect to one another and the base 8. Such base formations will be substantially tangent to the rim of cup 5 and they are preferably interconnected with inwardly curved surfaces or flutings 11 which touch the edge of cup 5 at their centers.

It will be understood that when this widened base construction is applied to the cylindrical leg 1a of Fig. 6 as shown in leg 1g of Fig. 27, the base formations or flattened surfaces 8, 9 and 10 will be continued to the center of the tee and join the other three legs 2g, 3g and 4g substantially as shown in Fig. 27. In applying this broadened base construction to the tapered form of leg, such as leg 1 of Fig. 1, it will be understood that the flattened surfaces and flutings 11 will be only as wide as the thickness of the head rim.

The golf tee of the present invention is inexpensive to manufacture since it can be made by a molding process and of inexpensive material. The golf tee is light in weight, easily and readily placed and retrieved—almost indestructible and represents an entirely new design which allows the use of a material which for the first time in history is no hazard to the gears and blades of golf course grass cutting machinery. The act of teeing the ball is achieved with a minimum of exertion and excitation—regardless of heights desired, elevations of tee terrains, and tee surface densities and textures.

It will be understood that changes other than those hereinbefore mentioned may be made in the construction of the golf tee without departing from the invention whose scope is set forth in the appended claims.

This application is in part a continuation of applicants' co-pending application Serial No. 104,856, filed July 15, 1949, and now abandoned.

We claim:

1. A golf tee structure having four legs joined together at their inner ends and each leg having a ball cup at its outer end, the angularity of the legs with respect to one another being such that when any three of the legs rest on a substantially horizontal surface the fourth leg is supported in substantially vertical position to receive and hold a golf ball in the cup thereof.

2. A golf tee structure as set forth in claim 1 in which the legs are of unequal length so as to provide a plurality of ball positions.

3. A golf tee structure as set forth in claim 1 in which all of the legs are of equal length.

4. A golf tee structure as set forth in claim 1 in which a pair of legs are of equal length, the other pair of legs being also of equal length but different in length from the first pair.

5. A golf tee structure as set forth in claim 1 in which three of the legs are of equal length and the fourth leg is of a different length.

6. A golf tee structure as set forth in claim 1 in which two of the legs are of equal length, the other two legs being unequal in length and different from the length of the first two.

7. A golf tee structure as set forth in claim 1 in which one leg is of substantially cylindrical shape.

8. A golf tee structure having four legs joined together at their inner ends and each leg having a ball cup at its outer end portion, the angularity of the legs with respect to one another and the configuration of the outer end portions being so coordinated that when any three of the legs rest on a substantially horizontal surface, the fourth leg is supported in substantially vertical position to receive and hold a golf ball in the cup thereof.

9. A golf tee structure as set forth in claim 8 in which the legs are of unequal length so as to provide a plurality of ball positions.

10. A golf tee structure as set forth in claim 8 in which the legs are of equal length.

11. A golf tee structure as set forth in claim 8 in which a pair of legs are of equal length, the other pair of legs being also of equal length but different in length from the first pair.

12. A golf tee structure as set forth in claim 8 in which three of the legs are of equal length and the fourth leg is of a different length.

13. A golf tee structure as set forth in claim 8 in which two of the legs are of equal length, the other two legs being unequal in length and different from the length of the first two.

14. A golf tee structure having four legs joined together at their inner ends, at least two of said legs each being formed to a provide a ball cup to support a golf ball, the angularity of the legs with respect to each other being such that when any leg having a ball cup at its outer end is positioned to extend substantially vertically upward, the other three legs will make contact with a horizontal plane.

15. A golf tee structure having four legs joined together at their inner ends, at least two of said legs each being formed to provide a ball cup to support a golf ball, the angularity of the legs with respect to each other being such that when any leg having a ball cup at its outer end is positioned to extend substantially vertically upward, the points on the other three legs most remote from the ball cup of the upright leg will make contact with a horizontal plane.

16. A golf tee structure as set forth in claim 15 in which one leg is of substantially cylindrical shape.

17. A golf tee structure having four legs of unequal length joined together at their inner ends, certain of said legs each being formed with a head portion to provide a ball cup to support a golf ball, the angularities of the legs with respect to each other and the configurations of the head portions being so coordinated that when any leg having a ball cup in its head portion is positioned to extend substantially vertically upward the points on the other three legs most remote from the ball cup of the upright leg will make contact with a horizontal plane, and the diameters of the head portions being unequal and arranged in inverse order with respect to the lengths of the legs.

18. A golf tee structure having four legs joined together at their inner ends, certain of said legs each being formed to provide a ball cup to support a golf ball, the angularity of the legs with respect to each other being such that when any leg having a ball cup at its outer end is positioned to extend substantially vertically upward, the other three legs will make contact with a horizontal plane, two of said legs being of equal length and the other two legs being also of equal length but different in length from the first two, and one of the two shorter legs being provided with a substantially widened base to contact the supporting surface and impart stability to the tee.

19. A golf tee structure having four legs joined together at their inner ends, certain of said legs each being formed at its outer end portion to provide a ball cup to support a golf ball, the angularity of the legs with respect to each other and the configuration of the outer end portions being so coordinated that when any leg having a ball cup at its outer end is positioned to extend substantially vertically upward, the other three legs will make contact with a horizontal plane, two of said legs being of equal length and the other two legs being also of equal length but different in length from the first two, and one of the two shorter legs being provided with a substantially widened base to contact the supporting surface and impart stability to the tee.

ROY. F. COLEMAN.
WILLIAM A. HANGER.

REFERENCES CITED

The following references are of record in the file of this patent:

UNITED STATES PATENTS

| Number | Name | Date |
|---|---|---|
| D. 65,261 | Freeble | July 22, 1924 |
| D. 70,800 | McDonald | Aug. 10, 1926 |
| D. 126,841 | Singer | Apr. 29, 1941 |
| D. 141,448 | Leufvenius | June 5, 1945 |
| 646,073 | Hempel | Mar. 27, 1900 |
| 1,030,554 | Wharton | June 25, 1912 |
| 1,510,302 | Budrow | Sept. 10, 1924 |
| 1,551,636 | Bloom | Sept. 1, 1925 |
| 1,650,141 | Lowell | Nov. 22, 1927 |
| 1,692,191 | Towsley | Nov. 20, 1928 |
| 1,974,782 | Muench | Sept. 25, 1934 |
| 2,074,519 | Shephard | Mar. 23, 1937 |
| 2,160,122 | Bundy | May 30, 1939 |
| 2,202,556 | Jordan | May 28, 1940 |
| 2,457,670 | Harvey | Dec. 28, 1948 |